US006923452B1

(12) United States Patent
Zachmeier et al.

(10) Patent No.: US 6,923,452 B1
(45) Date of Patent: Aug. 2, 2005

(54) DROP DOWN TRAILER

(75) Inventors: Leo Zachmeier, Mandan, ND (US); Tony Wald, Mandan, ND (US)

(73) Assignee: Leo P. Zachmeier, Mandan, ND (US)

( * ) Notice: Subject to any disclaimer, the term of this patent is extended or adjusted under 35 U.S.C. 154(b) by 73 days.

(21) Appl. No.: 10/306,216

(22) Filed: Nov. 29, 2002

Related U.S. Application Data

(60) Provisional application No. 60/333,887, filed on Nov. 30, 2001.

(51) Int. Cl.[7] .............................................. B60P 1/00
(52) U.S. Cl. ............................................... 280/6.151
(58) Field of Search ........................... 280/6.15, 6.151, 280/6.153

(56) References Cited

U.S. PATENT DOCUMENTS

| 3,589,538 | A | * | 6/1971 | Menzi ........................ 414/694 |
| 4,490,089 | A | | 12/1984 | Welker |
| 4,685,855 | A | | 8/1987 | Celli |
| 4,930,799 | A | | 6/1990 | Pihlstrom et al. |
| 5,308,213 | A | | 5/1994 | Gilbertson |
| 5,810,544 | A | | 9/1998 | Wellman |
| 6,273,435 | B1 | | 8/2001 | Stringer |
| 2004/0080125 | A1 | * | 4/2004 | Bird et al. ............... 280/6.153 |

* cited by examiner

Primary Examiner—Faye M. Fleming

(57) ABSTRACT

A trailer for use as an ice fishing house or for transporting a load from one area to another has a frame and a load bearing platform attached to the frame which is capable of being moved from a travel position to a ground level position. A lifting mechanism is located on each side of the trailer and made a part of the rubber torsion stub axle assembly connected to the trailer frame with the lifting mechanisms being operated by arm and handle assemblies attached to rubber torsion stub axles. When the arm and handle assemblies are rotated to a vertical position, the trailer frame is lowered to the ground level and when the arm and handle assemblies are rotated to a horizontal position, the trailer frame is raised to the travel position. Two securing means are used on each lifting mechanism to secure the frame in the travel position.

6 Claims, 6 Drawing Sheets

DROP DOWN TRAILER

CROSS-REFERENCE TO RELATED APPLICATION

This application claims the benefit of Provisional Patent Application Ser. No. 60/333,887, filed Nov. 30, 2001.

BACKGROUND OF THE INVENTION

1. Field of Invention

This invention relates to automobile trailers, specifically to an improved mechanism to lower the frame of the trailer to ground level.

2. Discussion of Prior Art

The traditional towed trailer has a rigid axle on which the wheels are rotatably supported. The axle is disposed beneath the load floor of the trailer. The body of the trailer is supported above the axle by leaf springs. Two or more shock absorbers are employed between the axle and the trailer floor to dampen the road vibrations. Depending on the load to be transported on the trailer, the wheel will have a rolling radius between twelve and twenty-two inches. This will position the trailer floor approximately eighteen to thrity inches above the ground.

The trailers generally do not have a tiltable or drop down body portion which requires the use of ramps to assist in loading the components onto the trailer. The ramps must be stored on the trailer during towing so that they will be available for unloading the components. Alternatively, the trailer can be detached from the towing vehicle and tilted at the rear axle to facilitate loading. However, the angle at which the trailer must be titlted is quite large which makes the loading or heavy items very difficult and hazardous.

Several prior trailer designs for lowering to ground level from a raised travel position have been developed over the years and are known in the art. The prior art trailer has a bed which is lowered to the ground using a winch operation such that the bed does not tilt when being raised or lowered. When using the prior art trailer, a piece of equipment is positioned or moved onto the lowered bed. The bed is then raised by a winch into an elevated position so that the bed can clear the ground. Operation of this prior art trailer included the raising or lowering by using a hand or automatic winch and cable which pulled the bed into a raised position. The prior art trailer required a great amount of power to raise the bed and the equipment thereon to the raised position. In addition, the failure of a rope, pulley or winch on the prior art trailer would result in damage to the trailer, the objects placed upon the trailer and possible injury to individuals.

The prior art trailer also was held in position by a standard type of toggle retaining latch to secure the bed to the frame once the bed was in the raised travel position. It is extremely important that the bed be properly secured in the raised position such that the objects being hauled are not damaged and that no injury occurs to individuals.

Similarly, U.S. Pat. No. 4,490,089 to Welker describes a motorcycle trailer having two principal assemblies connected together in a hinged arrangement at the rear ends thereof. One of the assemblies may be lowered to rest flat almost on the ground by a cooperative levering action with the other assembly, and by reversing such action the load-bearing assembly can be raised to a level position above ground. The single axle connecting the wheels does not obstruct the lowering of the load-bearing assembly because the axle has an offset movable configuration whereby a center portion thereof can be made to lie on the ground. The load-bearing platform can be lowered as far as such center portion, but can only be as wide as the center portion, which limits the load to a single motorcycle.

U.S. Pat. No. 4,685,855 to Celli is for another two-part system employing a tilting assembly hingedly connected at its rear end to a load platform. This design forces the load-carrying bed to move forward and backward as well as up and down, requiring the entire framework not including the tongue to be longer than the load platform, with wasted space forward of the platform and a portion of the platform overhanging its rear support. Additionally the wheels are mounted on stub axles attached to the main supporting framework, but no particular attachment means is described. Thus, the potential for torsion of the stub axles relative to the frame is not addressed.

U.S. Pat. No. 5,308,213 to Gilbertson is for another ground level loading trailer employing a lever member hingedly connected at its rear end to the load platform. In order for the load-bearing platform to be lowered to ground level, the trailer tongue must tilt upward to the rear, pivoting at the point of attachment to the towing vehicle. The patent discloses a conventional ball hitch mechanism. The angle of tilt of the tongue can be no greater than the angle at which the forward lip of the means for engaging the ball is stopped by the surface on which the ball is mounted. Again, there is no common axle, and there is no provision for limiting torsion action of the stub axles with respect to the frame.

U.S. Pat. No. 4,930,799 to Pihlstrom et al. describes another dual element trailer wherein the load is placed on a pallet lying flat on the ground behind the main trailer frame. The main frame is tiltable and supported by wheels mounted on a conventional common axle. When the frame is in its tilted position, it becomes a ramp onto which the pallet is drawn by means of a hand-operated winch. When the pallet is aligned properly on top of the frame, the frame is pivoted to a horizontal travel position. This design does not present a torsion problem due to the common axle. However, there are some drawbacks to this invention: the fact that more room is required to accommodate the pallet when it is on the ground behind the main frame, and the lack of levering action at the rear end of the load platform to improve mechanical advantage. The heaviest loads probably could not be pulled up the ramp with a hand-operated winch.

Other prior trailer designs included those which involve pushing or driving the load onto a ramp or tilting platform in order to reach the travel position above ground level, because the supporting wheels are connected by a conventional common axle which obstructs lowering of a load platform to a position flat on the ground. With this type of trailer, pushing a heavy ATV up a ramp typically requires two or more people. There is a danger of serious injury to those trying to load heavy wheeled vehicles on such a trailer. In addition, the entire trailer body is not able to be lowered to ground level, thereby precluding its use as an ice fishing house.

OBJECTS AND ADVANTAGES

Accordingly it is the object of the present invention to provide a trailer which can be easily lowered to ground level or raised from ground level by simply raising or lowering an arm and handle assembly located on each side of the trailer. The use of a arm and handle system for raising and lowering the trailer, avoids the danger and undependable nature of winch and pulley systems. Similarly, the present invention allows items to be loaded at ground level, thereby avoiding the dangers posed by trailers requiring a tilting platform. It is the further object of this invention to serve as an ice fishing house, whereby the trailer can be pulled onto a frozen lake or river, lowered onto the ice, and then used as an enclosed ice fishing house.

It is a further object of this invention to provide such a trailer with a suspension system permitting the raising and lowering of the trailer platform within the main frame, by having no common axle but rather rubber torsion stub axles for each wheel, such suspension system being designed to eliminate or minimize shock action of the road relative to the frame, thereby keeping the wheels properly aligned with the trailer frame. The prior art does not utilize the rubber torsion stub axles.

It is a further object of this invention to provide a means of raising and lowering the trailer through the movement of a single arm and handle system located adjacent to each trailer wheel, thereby allowing the trailer to be raised or lowered by a single person.

It is a further object of this invention to utilize a gas operated spring and a counterbalance weight to reduce the physical effort required to raise and lower the trailer.

It is a further object of this invention to provide a double pin system for properly securing the wheel frame to the trailer when in the travel position.

It is a further object of this invention to provide a compact design with no need for fore and aft telescoping of parts which would require additional space for loading and unloading.

Further objects and advantages of our invention will become apparent from a consideration of the drawings and ensuing description.

SUMMARY OF THE INVENTION

It is the object of the present invention to provide a new and improved trailer, allowing the trailer to be easily and conveniently raised and lowered to ground level with the simple movement of a arm and handle system located on each side of the improved trailer. By utilizing the offset of the rubber torsion stub axle and combining the offset with a centric like action, adding a arm and handle system to give leverage and gas operated springs for ease of operation enables the improved trailer to both raise moderate loads easily and quickly by hand, and have a suspension system that will absorb the constant road shock while in transit. There is no movement of the trailer wheels when the trailer is raised or lowered. The trailer may be lowered to ground level to provide a fully insulated and fully functional ice fishing house or can be lowered to load or unload objects onto or from the trailer.

SUBSTITUTE DETAILED DESCRIPTION OF THE PREFERRED EMBODIMENTS

Figure 13:
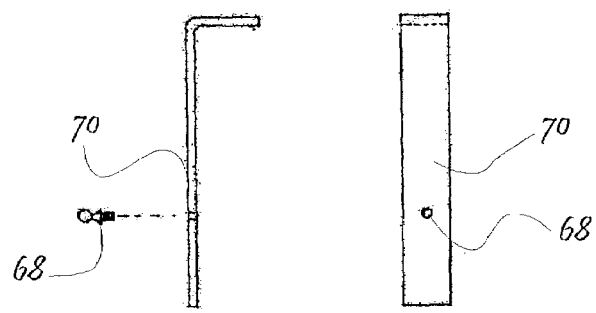
FIG. 13 is a partial view of the right fender support bracket with a ball pin for attachment of a gas operated spring.
Figure 14:
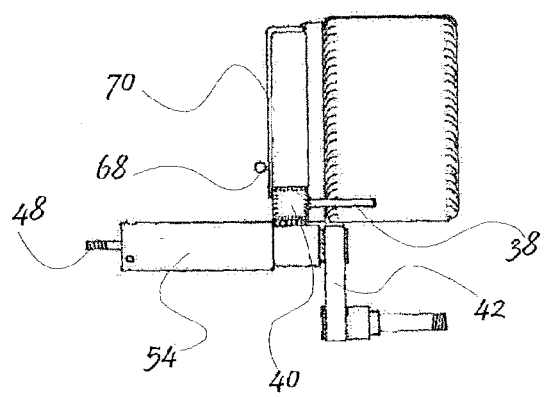
FIG. 14 is a partial exploded perspective of the right fender support bracket (FIG. 13) attached to the arm and handle assembly (FIGS. 9, 11, 12)
Figure 15:
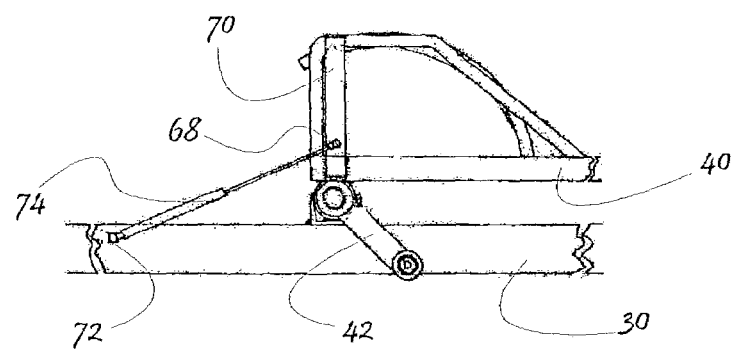
FIG. 15 is a partial exploded perspective view of the left lifting mechanism (FIGS. 11, 12) and left fender support bracket (FIGS. 13, 14) and the attachment of a gas operated spring shock to the fender support bracket and the frame members of the trailer.

Referring to FIGS. 1 through 17, a ground-level trailer for use as an ice fishing house or for loading and unloading hauled items consists of a rectangular shaped frame members 30 with cross members 64; a tongue assembly attached to the front end frame member (not shown); at least one pair of wheels 32 rotating on rubber torsion stub axles 42 connected to the frame members and cross members (FIG. 10) through a pair of cylindrical piping assemblies; arm and handle assemblies (FIG. 6) attached to each of the rubber torsion stub axle assemblies (FIGS. 7, 11) which can be rotated to raise or lower the frame members 30 and cross members 64 (FIGS. 1,2,3,4,5,6); fender support brackets (FIG. 13) attached to each arm and handle assembly (FIG. 14); and a pair of gas operated springs attached to the frame members 30 of the trailer and the fender support brackets (FIG. 15).

The trailer includes a frame having frame members 30 and cross members 64. One end of each of the frame members 30 is operatively connected to longitudinally extending cross members 64 which converge as the cross members 64 extend from the frame members 30. Mounted on the frame members 30 and cross members 64 is a bed which includes a load-bearing platform.

The preferred embodiments of the invention include a pair of independent lifting and lowering mechanisms on each side of the trailer which are made a part of the rubber torsion stub axles 42. The ability to raise and lower the frame members 30 and cross members 64 of the trailer is accomplished through the use of a pair of rubber torsion stub axle assemblies (FIGS. 3, 6, 12) which can be lowered to the ground by removing ring pins 34 and locking pins 36 and then moving the arm and handle assemblies 38, 40, 84 located adjacent to each wheel to either a vertical or horizontal position.

Figure 7:
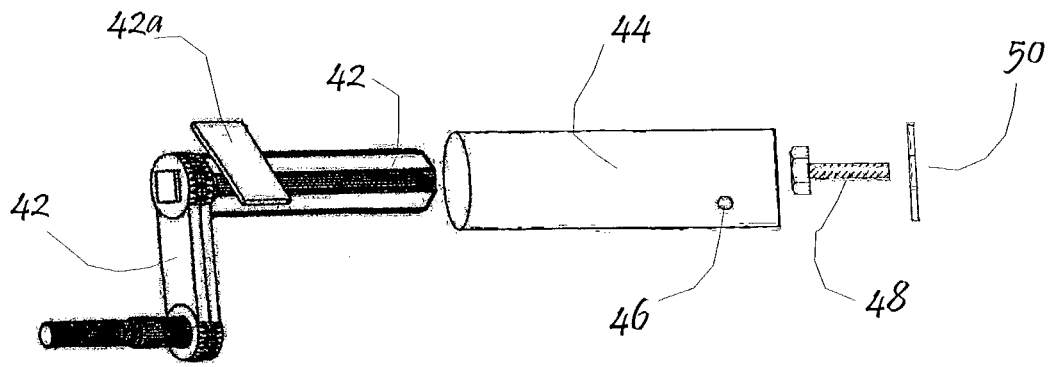
FIG. 7 is a partial exploded perspective view of the left rubber torsion stub-axle and the insertion and attachment of a portion of the rubber torsion stub axle into the first open end of the first cylindrical pipe, the attachment of a washer and bolt to the second open end of the first cylindrical pipe and a hole bored into the top side of the first cylindrical pipe near the second open end for the insertion of a large ring pin.

Referring to FIG. 7, the raising and lowering mechanisms are composed of rubber torsion stub axles 42 with the square end of the rubber torsion stub axles 42 being inserted into a piece of first cylindrical piping 44 having a first open end and a second open end and joining the first cylindrical piping 44 to the rubber torsion stub axle 42 by attaching at connection points. Holes 46 are bored into the top side of the first cylindrical piping 44 near the second open end of the first cylindrical piping 44. A bolt 48 is inserted into a first washer 50 and the bolt 48 and first washer 50 are welded together on bolt head side. The bolt 48 and first washer 50 assembly are then fixedly attached to the second open end of first cylindrical piping 44 with the bolt 48 threads extending beyond the second open end of the first cylindrical piping 44.

Figure 8:
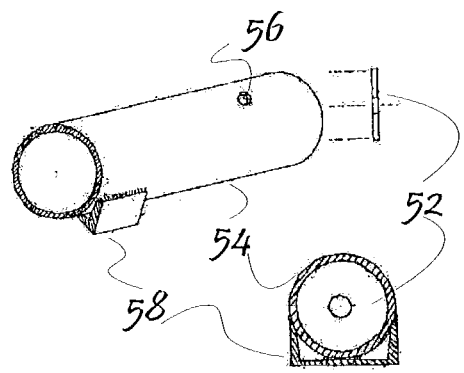
FIG. 8 is a partial exploded perspective view of the first open end of the second cylindrical pipe, the attachment of c-channel to the bottom side near the first open end of the second cylindrical pipe, the attachment of a washer to the second open end of the second cylindrical pipe and a hole bored into the top side of the second cylindrical pipe near the second open end for the insertion of a large ring pin.
Figure 9:
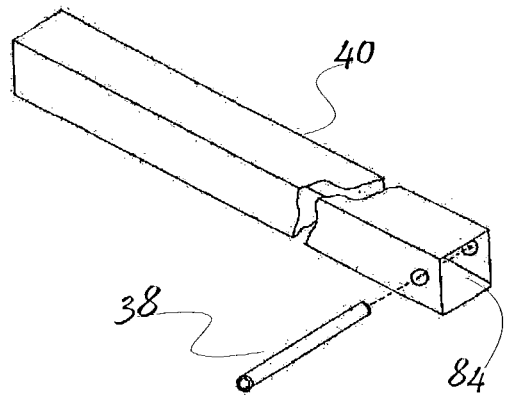
FIG. 9 is a partial exploded perspective view of the arm and handle assembly.

Referring to FIG. 8, a second washer 52 is welded to the second open end of a second cylindrical piping 54, with a hole 56 bored into the top side of the second cylindrical piping 54 near the second open end for insertion of a ring pin 34. A section of c-channel 58 is fixedly attached to the bottom side of the second cylindrical piping 54 near the first open end.

Figure 10:
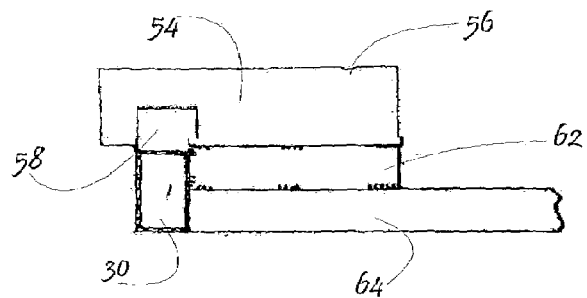
FIG. 10 is a partial exploded perspective view of a tapered gusset attached to the trailer frame members, to the trailer cross members and to the bottom side of the second cylindrical pipe (FIGS. 8, 10) beginning at the c-channel and extending to the second open end of the second cylindrical pipe.
Figure 11:
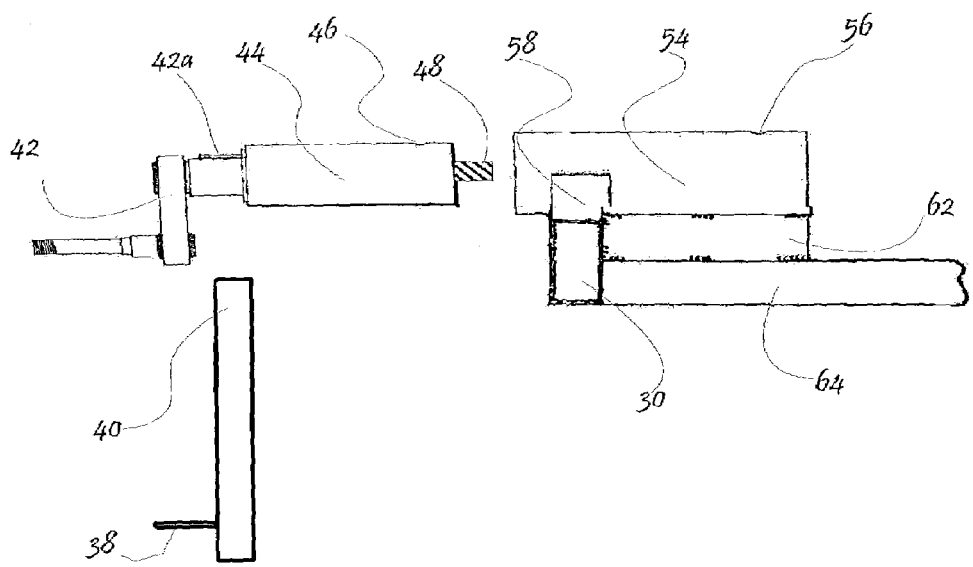
FIG. 11 is a partial exploded perspective view showing the insertion of the completed components illustrated in FIG. 7 into the completed second cylindrical pipe assembly (FIG. 8) and the attachment of the arm and handle assembly (FIG. 9) onto the rubber torsion stub-axle.
Figure 12:
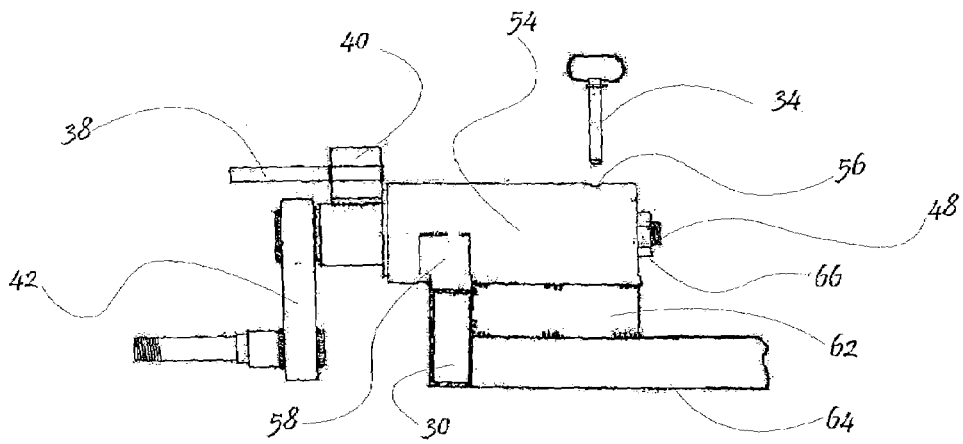
FIG. 12 is a partial view of the completed left lifting mechanism (FIG. 11) with a securing ring pin inserted into the holes near the second open end of the first and second cylindrical pipes (FIGS. 7, 8, 10)

The second cylindrical piping assemblies 52, 54, 56, 58 are fixedly attached to the frame members 30 and cross members 64 with the first open end of the second cylindrical piping 54 contiguous with the outside edge of the side frame member 30 (FIGS. 10, 11, 12). A tapered gusset 62, with the wide end of the tapered gusset 62 opposite the frame members 30, is fixedly attached to the frame members 30, cross members 64 and c-channel 58 (FIG. 11).

The rubber torsion stub axle assemblies 42, 42a, 44, 46, 48, 50 (FIG. 7) are inserted into the second cylindrical piping assemblies 52, 54, 56, 58 (FIG. 8) with the bolt 48 of the bolt 48 and first washer 50 assemblies attached to the second open end of the first cylindrical piping 44 inserted through the second washer 52 attached to the second open end of second cylindrical piping 54. The bolt 48 is secured to the second washer 52 with lock nut 66, thereby allowing the rubber torsion stub axle assemblies 42, 42a, 44, 46, 48, 50 to rotate within the second cylindrical piping 54. To remove and service a rubber torsion stub axle assembly 42, 42a, 44, 46, 48, 50, the lock nut 66 is removed and the rubber torsion stub axle assembly 42, 42a, 44, 46, 48, 50 is slid out of the second cylindrical piping 54.

Arm and handle assemblies for rotating the rubber torsion stub axle assemblies 42, 42a, 44, 46, 48, 50 within the second cylindrical piping 54 are comprised of a section of square tubing 40 having a first open end and a second open end. A section of cylindrical tubing 38 is fixedly attached to the square tubing 40 near the square tubing's 40 first open end (FIG. 11). The cylindrical tubing 38 serves as a handle for the operator. The second open end of the square tubing 40 is fixedly attached to a plate 42a contained on the top side of the rubber torsion stub axle 42 (FIG. 11). When the square tubing 40 and cylindrical tubing 38 (arm and handle assemblies) are rotated, the rubber torsion stub axle assemblies 42, 42a, 44, 46, 48, 50 are also rotated within the second cylindrical piping 54 resulting in the frame members 30 and cross members 64 being lowered to ground level or raised from ground level. A counterbalance weight 84 can be inserted into the first open end of the square tubing 40 as necessary to more easily raise or lower the frame members 30 and cross members 64.

Fenders for covering the wheels are composed of fender support brackets 70, which are comprised of a section of strap iron bent inward at the top ends (FIG. 13), with the bottom ends fixedly attached near the second open end of the square tubing 40 of the arm and handle assemblies 38, 40, 84 and the top end fixedly attached to a pre-formed fender (FIGS. 14, 15).

Gas spring assemblies are used to assist in the raising and lowering of the frame members 30 and cross members 64 which gas spring assemblies are composed of a gas spring 74 having a first end and a second end with the first end of the gas spring 74 being removably attached to a first ball pin 68 which first ball pin 68 is fixedly attached to the fender support bracket 70 (FIGS. 13, 14, 15) and the second end of the gas spring 74 which is removably attached to a second ball pin 72 which second ball pin 72 is fixedly attached to the frame members 30 (FIG. 15).

Figure 16:
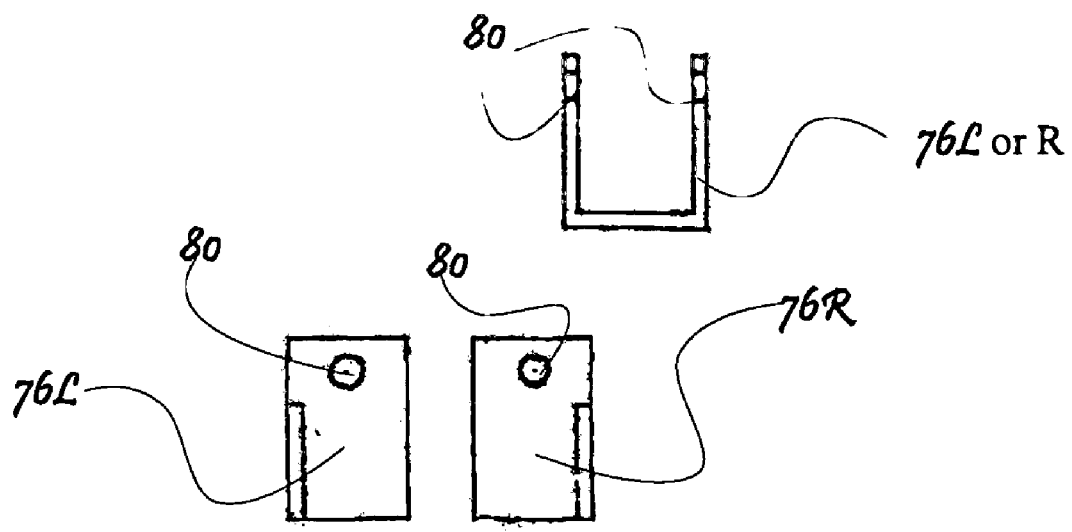
FIG. 16 is a partial side and front view of the arm and handle bracket hold down assemblies with a hole bored near the top end of the handle bracket hold down assemblies for insertion of a locking pin.
Figure 17:
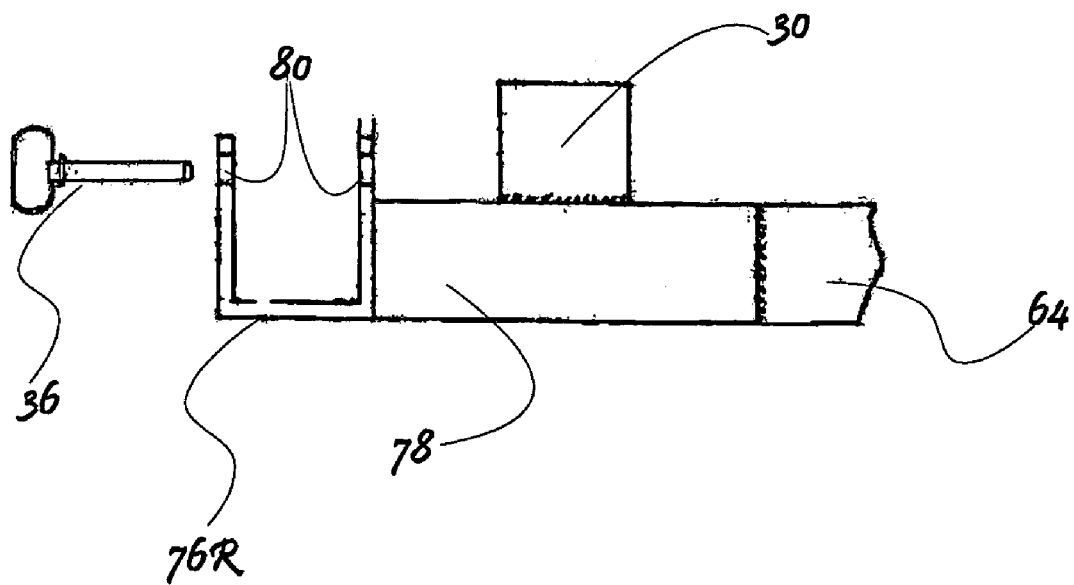
FIG. 17 is a partial view of the left arm and handle assembly (FIG. 16) attached to the frame members of the trailer and the insertion of a locking pin into the hole bored near the top end of the arm and handle hold down bracket assembly.

A pair of hold down bracket assemblies for maintaining the arm and handle assemblies 38, 40, 84 in a fixed position while traveling are comprised of a section of u-shaped strap iron 76l or 76r with a hole 80 bored through the sides of the u-shaped strap iron 76l or 76r (FIG. 16). A section of flat strap iron 78 fixedly attached to the bottom end of the u-shaped strap iron 76l or 76r and the flat strap iron 78 is fixedly attached to the frame members 30 and cross members 64. When the trailer is in its travel position, the arm and handle assemblies 38, 40, 84 are rotated toward the back end of the trailer causing the rubber torsion stub axle assemblies 42, 42a, 44, 46, 48, 50 to rotate within the second cylindrical piping 54 and raise the frame members 30 and cross members 64 off of ground level. Once the arm and handle assemblies 38, 40, 84 have been fully rotated, a portion of the square tubing 40 of the arm and handle assemblies 38, 40, 84 is placed within the hold down bracket assemblies 76l or 76r, 78, 80 and locked in place with locking pins 36 inserted into the holes 80 bored through the u-shaped strap iron 76l or 76r (FIG. 17). Ring pins 34 are also inserted in the holes 46, 56 on the top sides of the first and second cylindrical piping 44, 54 so as to restrict the rubber torsion stub axle assemblies 42, 42a, 44, 46, 48, 50 from rotating when in a travel position or lowered position.

Figure 1:
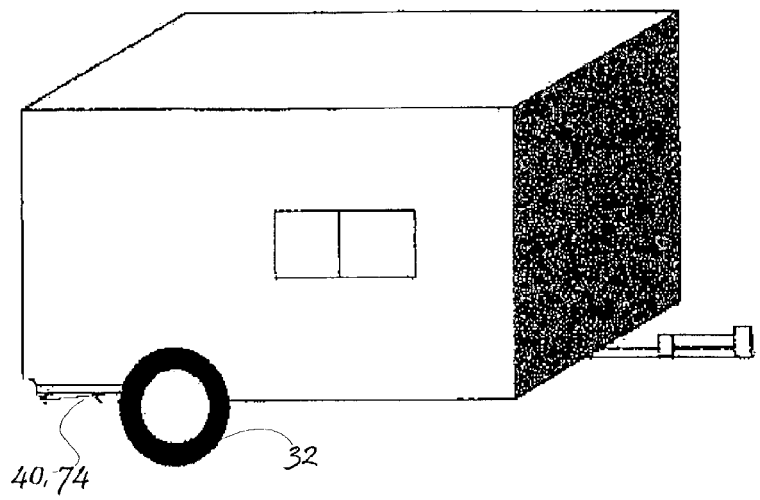
FIG. 1 is a side perspective view of the trailer in its traveling position.
Figure 2:
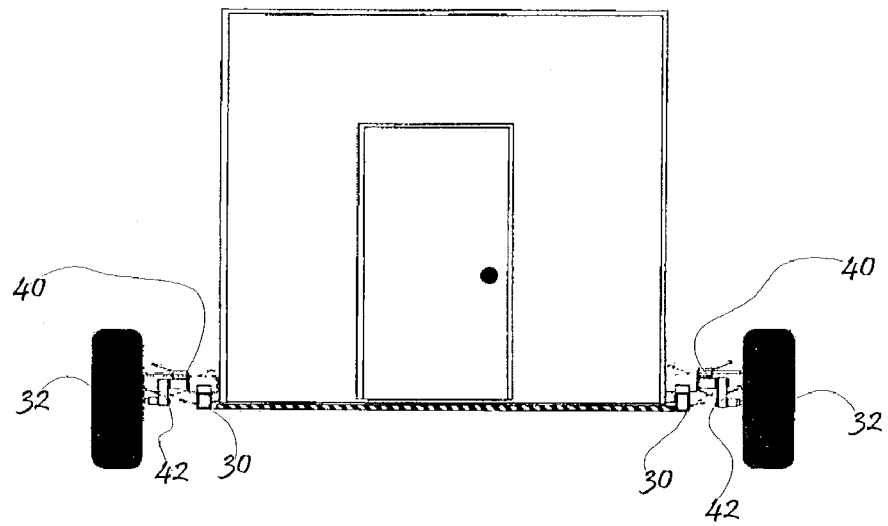
FIG. 2 is a rear perspective view of the trailer in its traveling position.
Figure 3:
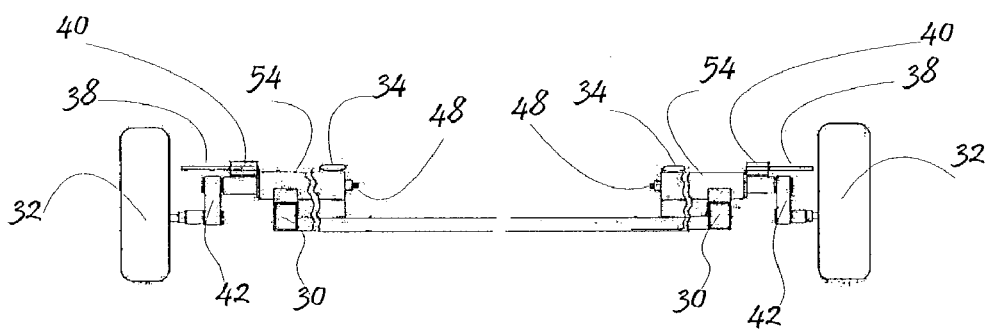
FIG. 3 is a rear perspective view of the trailer in its traveling position illustrating the location and attachment of the rubber torsion stub-axle assemblies to the trailer frame.

FIGS. 1, 2 and 3 illustrate the trailer in its traveling position by placing the arm and handle assemblies 38, 40, 84 in a horizontal position with the arm and handle assemblies 38, 40, 84 placed in the hold-down bracket assemblies 76l or 76r, 78, 80 and locking pins 36 inserted into the holes 80 contained in the hold-down bracket assemblies 76l or 76r, 78, 80 to insure the arm and handle assemblies 38, 40, 84 do not move during travel. Moving the arm and handle assemblies 38, 40, 84 form the vertical (lowered) position to the horizontal (travel) position can be done by a single person of average size since the gas spring 74 facilitates the movement of the arm 40 and handle 38 at a steady pace with minimal effort required. Once the arm and handle assemblies 38, 40, 84 have been secured in the hold-down brackets 76l or 76r with the locking pins 36 inserted into the holes 80 of the u-shaped strap iron 76l or 76r and ring pins 34 inserted into the holes 46, 56 bored in the first cylindrical piping 44 and the second cylindrical piping 54 to insure that the rubber torsion axle assemblies 42, 42a, 44, 46, 48, 50 do not rotate during travel resulting in the trailer being inadvertently lowered or otherwise damaged.

Once the trailer has reached its intended destination, the trailer can be lowered when attached or unattached to the towing vehicle. The trailer is lowered by removing the ring pins 34 and locking pins 36 and then lifting the arm and handle assemblies 38, 40, 84 from the hold down bracket assemblies 76l or 76r, 78, 80 from a horizontal position to a vertical position on each side of the trailer. Moving the arm and handle assemblies 38, 40, 84 form the horizontal (travel) position to the vertical (lowered) position can be done by a single person of average size. The gas spring 74 facilitates the movement of the arm 40 and handle 38 at a steady pace with minimal effort required. The gas spring 74 reduces the possibility of the arm and handle assemblies 38, 40, 84 moving too quickly from the horizontal position to the vertical position, thereby avoiding injury to the operator.

The entire invention is supported at three points. In front, the front end of the trailer tongue either is borne on a trailer hitch attached to a motor vehicle, or when disconnected from a vehicle, rests on the ground. At the sides, the trailer is supported by at least one pair of opposing wheels 32 each of which turns on a rubber torsion stub axle assembly 42, 42a, 44, 46, 48, 50 which are contained within the second cylindrical piping assemblies 52, 54, 56, 66 with the second cylindrical pipe attached to the frame members 30, gusset 62 and cross members 64.

Figure 4:
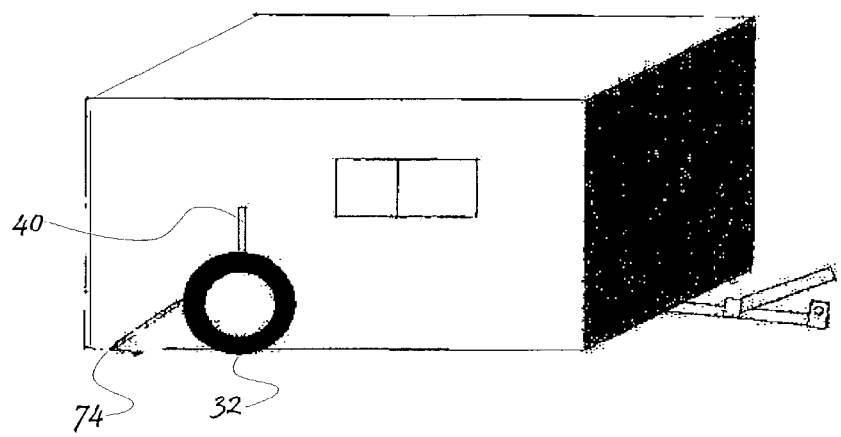
FIG. 4 is a side perspective view of the trailer in its loading or down position.
Figure 5:
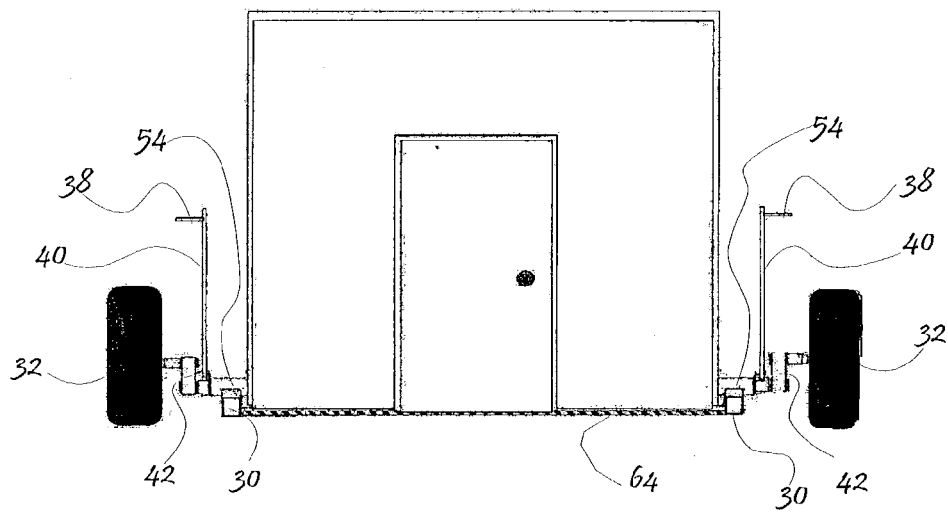
FIG. 5 is a rear perspective view of the trailer in its loading or down position.
Figure 6:
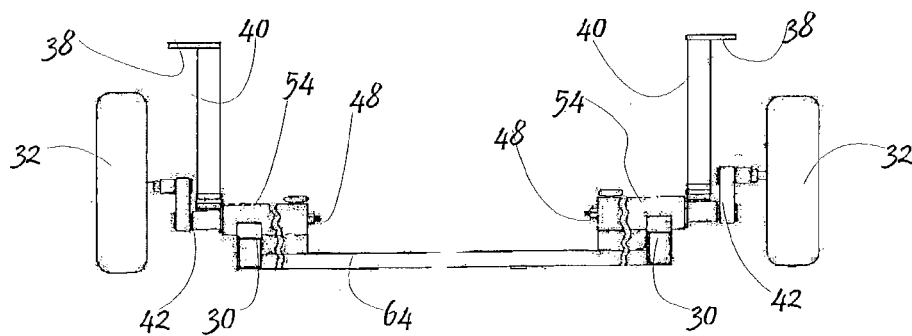
FIG. 6 is a rear perspective view of the trailer in its loading or down position illustrating the location and attachment of the rubber torsion stub-axle assemblies to the trailer frame, and the arm and handle assemblies.

To utilize this invention as an ice fishing house, only one person is needed to operate it. The trailer is placed in its travel position, attached to a vehicle and transported (FIGS. 1, 2, 3). Once the trailer is at its intended location, the ring pins 34 and locking pins 36 are removed. The arm and handle assemblies 38, 40, 84 are raised from the hold-down bracket assemblies 76l or 76r, 78, 80 and moved from a horizontal position to a vertical position resulting in the frame members 30 and cross members 64 of the trailer resting upon the surface (FIGS. 4, 5, 6). The ice fishing house can be lowered by a single person since each side of the trailer can be lowered independently. When the ice fishing house is to be moved, a single operator may move each arm and handle assembly 38, 40, 84 from the vertical position to a horizontal position by placing the arm and handle assemblies 38, 40, 84 into the hold-down bracket assemblies 76l or 76r, 78, 80 and then inserting the locking pins 36 and the ring pins 34.

To utilize this invention for hauling a lawn mower or other item, only one person is needed to load it. The lawn mower is driven or pushed onto the ground-level trailer platform and properly secured. Once the lawn mower is loaded onto the trailer, the handle and arm assemblies 38, 40, 84 on the left and right sides of the trailer are moved from a vertical position to a horizontal position and properly secured in place with locking pins 36 and the rubber torsion stub axle assemblies 42, 42a, 44, 46, 48, 50 are properly secured with ring pins 34.

Various changes and departures may be made to the invention without departing from the spirit and scope thereof. Thus it is not intended that the invention be limited to what is described in the specification and illustrated in the drawings, rather only as set forth in the claims.

What is claimed is:

1. A ground-level-loading trailer or drop down ice fishing house apparatus consisting of a rectangular shaped main frame having first and second longitudinally extending frame members in opposed relationship with cross members extending between the frame members in opposed relationship, mounted on the topside of the frame members and cross members is a bed which includes a load-bearing platform movable between a lowered position and a raised position:

a pair of rubber torsion stub axle assemblies for use as raising and lowering mechanisms on opposing sides of the trailer with each consisting of rubber torsion stub axle with a square end of the rubber torsion stub axle being inserted into a piece of first cylindrical piping having a first open end and a second open end and joining the first cylindrical piping to the rubber torsion stub axle by attaching at connection points and a hole bore into the top side of first cylindrical piping near the second open end for insertion of a ring pin and joined to the second open end of the first cylindrical piping is a bolt and washer assembly with the bolt threads extending beyond the second open end of the first cylindrical piping;

a second cylindrical piping assembly consisting of a second cylindrical piping with a first open end and a second open end with a washer fixedly attached to the second open end of the second cylindrical piping and a hole bore on the top side of the second cylindrical piping near the second open end for insertion of a ring pin and a segment of c-channel fixedly attached to the bottom side of the second cylindrical piping near the first open end;

the second cylindrical piping assembly is fixedly attached to the frame members and cross members with the first open end of the second cylindrical piping contiguous with an outside edge of the side frame members;

the rubber torsion stub axle assembly is inserted into the second cylindrical piping assembly with the bolt attached to the second open end of the first cylindrical piping inserted through the washer attached to the second open end of the second cylindrical piping with the bolt of the first cylindrical piping assembly secured to the washer of the second cylindrical piping assembly with a lock nut;

arm and handle assemblies for raising and lowering the frame members and cross members are comprised of square tubing having a first open end and a second open end with a section of cylindrical tubing fixedly attached near the first open end of the square tubing and the second open end of the square tubing fixedly attached to a metal plate on the top side of the rubber torsion stub axle adjacent to the first open end of the first cylindrical piping; and a pair of hold down bracket assemblies for maintaining the arm and handle assemblies in a fixed position while traveling are comprised of a section of u-shaped strap iron with a hole bored through the sides of the u-shaped strap iron and a section of flat strap iron fixedly attached to the bottom end of the u-shaped strap iron and the flat strap iron fixedly attached to the frame members and cross members.

2. The apparatus according to claim 1 wherein fenders for covering the wheels are composed of a fender support bracket, which is comprised of a section of strap iron bent inward at the top ends, having a top end and a bottom end with the bottom end fixedly attached near the second open end of the square tubing of the arm and handle assemblies and the top end fixedly attached to a pre-formed fender.

3. The apparatus according to claim 1 or 2 wherein gas spring assemblies are used to assist in the raising and lowing of the drop down trailer which gas spring assemblies are composed of a gas spring having a first end and a second end with the first end of the gas spring being removably attached to a first ball pin which first ball pin is fixedly attached to the fender support bracket and the second end of the gas spring which is removably attached to a second ball pin which second ball pin is fixedly attached to the frame members.

4. The apparatus according to claim 1 wherein the arm and handle assemblies are secured in a travel position by a pair of locking pins which locking pins are inserted through the holes bored into the hold down bracket assemblies and thereby restricting the arm and handle assemblies from rotating.

5. The apparatus according to claim 1 or 4 wherein the rubber torsion stub axle and first cylindrical piping are secured in a fixed position and unable to rotate by a pair of ring pins which are inserted into the holes bored on the top sides of the first cylindrical piping and the second cylindrical piping.

6. A ground level loading trailer comprising:
  a generally rectangular perimeter frame having frame members on each side with cross members being attached at each end thereof to the frame members, the frame members each having a forward portion and a rear portion;
  ground engaging wheels for supporting the frame members and cross members above the ground with each wheel mounted on a separate rubber torsion stub axle;
  a load-bearing platform attached to the frame members and cross members having a forward end and a rear end and movable between a ground-level loading position and a raised travel position within the frame members and cross members;
  a pair of independent lifting mechanisms on each side of the trailer for raising and lowering the frame members, cross members and platform, the lifting means comprising a square portion of a rubber torsion stub axle being attached to and contained in a first cylindrical pipe having a first open end and a second open end with a bolt and washer assembly attached to the second open end with the bolt threads extending out from the second open end, and the first cylindrical pipe is inserted into and contained within a second cylindrical pipe with a first open end and a second open end, on the second open end of the second cylindrical pipe is attached a washer, the bolt extending from the second open end of the first cylindrical pipe is inserted through the washer contained on the second open end of the second cylindrical pipe with a locking nut attached to the bolt so as to enable the rubber torsion stub axle assembly to rotate within the second cylindrical pipe, the second cylindrical pipe is attached to the frame members and cross members;
  arm and handle assemblies for raising and lowering the frame members and cross members comprised of square tubing having a first open end and a second open end with a section of cylindrical tubing fixedly attached near the first open end of the square tubing and the second open end of the square tubing fixedly attached to a metal plate on the top side of the rubber torsion stub axle adjacent to the first open end of the first cylindrical piping;
  a pair of hold down bracket assemblies for maintaining the arm and handle assemblies in a fixed position while traveling are comprised of a section of u-shaped strap iron with a hole bored through the sides of the u-shaped strap iron and a section of flat strap iron fixedly attached to the bottom end of the u-shaped strap iron and the flat strap iron fixedly attached to the frame members and cross members;
  locking means for securing the arm and handle assemblies in the hold down bracket assemblies when traveling; and
  securing means for maintaining the independent lifting mechanisms in a raised travel position or lowered loading position.

\* \* \* \* \*